May 6, 1958 R. A. GAISER ET AL 2,833,902
ELECTRICALLY CONDUCTING GLASS
Filed Oct. 30, 1953

INVENTORS
Romey A. Gaiser and
BY Lazarus D. Thomas
Nobbe & Swope
ATTORNEYS

United States Patent Office 2,833,902
Patented May 6, 1958

2,833,902

ELECTRICALLY CONDUCTING GLASS

Romey A. Gaiser, Toledo, and Lazarus D. Thomas, Walbridge, Ohio, assignors to Libbey-Owens-Ford Glass Company, Toledo, Ohio, a corporation of Ohio Application October 30, 1953, Serial No. 389,319

8 Claims. (Cl. 201—73)

The present invention relates broadly to electrically conducting glass of the type made up of a sheet of glass having a transparent electrically conducting film of tin oxide, in contact with metal electrodes, on a surface thereof. More particularly it has to do with an article of the above general character in which the characteristic weak and high resistance interface between the electrode and the stannic oxide film does not exist.

Now transparent, electrically conducting films of tin oxide are well known; and deicing windshields or windows for aircraft, which involve such films on a glass sheet provided with spaced metal electrodes, have been used commercially. Moreover, the problem of arcing at the juncture or meeting line of the electrically conducting film and the electrodes, or at the electrode-film interface, has been recognized and vigorous steps have been taken in attempting to overcome it.

In fact, most of these facts have been set forth in considerable detail in a patent to Romey A. Gaiser, 2,628,299, issued February 10, 1953. In addition, this patent discloses a solution to the problem which involves an air-dry silver bridge or overlay over the joints between the film and the electrodes. The invention of that patent has been widely used in the commercial production of aircraft glass, and has proved to be entirely satisfactory for the purpose. However, as now employed, it entails and requires an additional step in an already expensive and time consuming procedure.

It is an important aim of the present invention to provide an electrically conducting glass unit of the general character above described but which exhibits a relatively strong and low resistance interface between the metal electrode and the stannic oxide film, and which overcomes the difficulties heretofore encountered in such units without the necessity for extra process steps in addition to those of film and electrode application, or for the introduction of additional elements to connect or overlie the film and electrodes.

Briefly stated, the invention is based on my discovery that such a unit is provided when a special type of tin oxide film, or rather a tin oxide film formed from a particular tin compound, is combined with an electrode of a particular metal or metal composition.

Further objects and advantages of the invention will become more apparent during the course of the following description, when taken in connection with the accompanying drawings.

In the drawings, wherein like numerals are employed to designate like parts throughout the same:

Referring now, more particularly to the drawings, there has been illustrated therein conventional methods and apparatus for applying electrodes and electrically conducting films to glass sheets, and by means of which the article of the present invention can also be produced in accordance with the procedures contemplated thereby.

Figure 1:
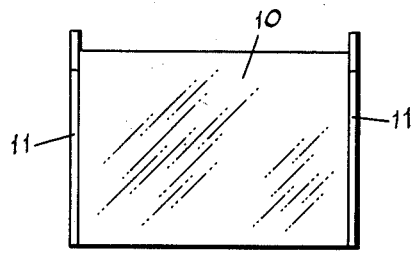
Fig. 1 is a plan view of a sheet of glass provided with the electrodes and film of the invention.
Figure 2:
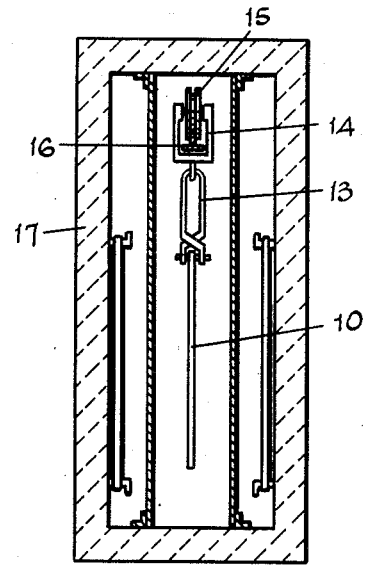
Fig. 2 is a vertical, transverse, sectional view through a furnace for heating glass sheets prior to filming.

Thus, as explained in Patent 2,628,299, referred to above, it is customary in rendering a sheet of glass electrically conducting to first provide such a sheet, designated 10 in Fig. 1, with suitable electrodes 11 positioned along opposite margins of the sheet. Electrodes of sprayed copper, sprayed copper alloys, gold, silver and platinum fluxes and combinations of these materials have all been used satisfactorily.

Figure 3:
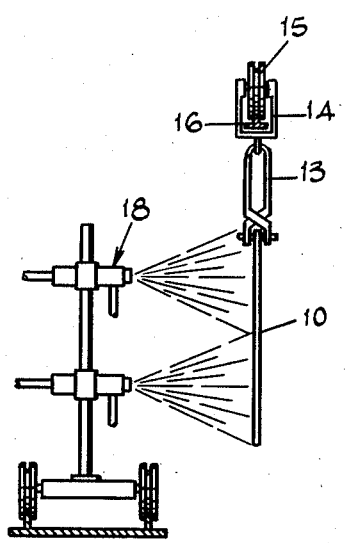
Fig. 3 is a diagrammatic end view of one form of apparatus for applying a film to the heated sheet.

With the electrodes in place, the sheet 10 is hung from tongs 13 suspended from a carriage 14 provided with wheels 15 running on a monorail 16. In this way the sheet is passed into and through a tunnel type furnace 17 within which it is heated to substantially its point of softening. After the sheet 10 has reached the required temperature it is removed from the furnace and brought into filming position as shown in Fig. 3 where it is uniformly sprayed over its entire surface with a solution of tin halide from the spray guns 18.

Figure 5:
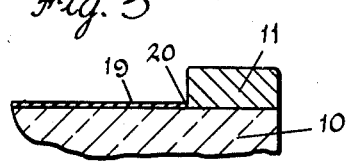
Fig. 5 is a fragmentary sectional view through one of the electrodes on the glass sheet of Fig. 1.

The tin halide, for example stannic tetrachloride, reacts with the hot glass to leave a thin, transparent, tightly adherent, electrically conducting coating 19 on the glass; and, as can be seen in Fig. 5 the film covers the entire surface of the glass between the electrodes 11 and is in electrical contact with the electrodes.

However, as explained in Patent 2,628,299, with units prepared in this manner difficulty is experienced due to the arcing which occurs at the meeting line of the electrode and film, or the electrode film interface 20. The patent states that the precise reason for the arcing is not definitely known, but it was and is still well known that a weak and high resistance interface exists between the electrodes and films when applied in the manner and with the materials described. Moreover, lower and lower resistances are being demanded in units of this general type that are to be used in aircraft; this may require heating the glass to a higher temperature (around 1350° F.) during filming; and the higher the glass temperature in the filming operation, the higher becomes the resistance of the interface.

The cause of this weak interface and the possibility of correcting it has been studied extensively. But no satisfactory answer, other than the idea of a metal bridge, has heretofore been forthcoming. It was recently theorized that electrochemical phenomena could be responsible for such a situation and the results of the experiments devised to explore this possibility are disclosed in an application of Lazurus D. Thomas, filed October 30, 1953, Serial No. 389,318.

In that connection also, it was observed that the high resistance interfacial band could be seen easily in a microscope and was roughly 0.1 mm. in width. The interfacial band always followed exactly the outline of the edge of the electrode, any bends, curves or points in the electrode being exactly repeated in the interface.

Further experiments were made to see if a similar interface would be obtained without the presence of the stannic oxide film. To this end a regular fired on metal electrode was applied to the glass without the filming operation. No such interfacial band was found. However, after filming this same unit, the usual weak interface was present.

In another experiment a pure gold electrode, without a glass frit was fired onto a glass sheet before filming. As before, no high resistance interface appeared prior to filming, but became very evident after filming. The same results were obtained with thermally evaporated electrodes and electrodes deposited by the regular mirror silvering process.

Also, a non-conducting mixture of glass frit and an oil base, with no silver present, was prepared and applied to a lite of glass in the same manner as a regular electrode. After firing and filming this electrode, no interfacial band was observed.

As a final experiment, a unit provided with electrodes and filmed with a tin halide was wiped with zinc and hydrochloric acid to reduce the film to metallic tin but not to dissolve the metal. Under microscopic examination, it was seen that the interface was either white or a light gray as compared to the main body of the film which was a deep, nearly opaque gray.

From these tests, the following conclusions were drawn. The interface width of approximately 0.1 mm. appears to be too wide to be explained on the basis of non-wettability of the electrode by the stannic oxide film. Also, the interface appears to be too wide to be explained on the basis of the formation of a non-conducting compound at the boundary.

The glass frit present in the regular fired-on electrodes is eliminated as the cause of the high resistance interfacial band by the following facts. No such band appears at the edge of a fired on metal electrode when no film is present. The usual weak interfacial band appears when the pure metals (silver, gold and platinum) are used as electrodes. No interfacial band appears if no metal is present in the electrode mixture as shown in the previously mentioned glass frit experiment. From the lighter color of the interface in the zinc and hydrochloric acid experiment, it is concluded that the film is thinner in this region, dropping off exponentially in thickness from the main body of the film toward the silver electrode.

However, according to the present invention, we have discovered that the high resistance interface will not form, even at high temperatures, if a fired on silver coating is used as the electrodes and the tin oxide film is produced by the application to the hot glass of a chloride free spray of an organic tin compound.

Among the compounds we have used successfully for this purpose are dibutyl tin diacetate, dibutyl tin diformate, dibutyl tin dilaurate, dibutyl tin oxide, dibutyl diphenyl tin, dibutyl tin ethylate, tin oleate, tetraphenyl tin, diethyl tin ethylate, tetrabutyl tin and dibutyl tin diethylate.

The organic tin compounds can be sprayed alone, or with an organic, chloride ion-free solvent and/or an organic, chloride ion-free activator. When used, the solvent is added for reasons of economy, and to improve the light transmission of the film, and the activator to lower the resistance of the film. The particular solvent or activator to be used, and the precise amount of either, forms no part of this invention, although representative spray compositions will be set forth for illustrative purposes.

For example, one mixture that has been found to be very satisfactory is dibutyl tin diacetate containing triphenylstibine as an activator; while another successful spray is made up of 50% of the organic tin compound and 50% of an organic alcohol with or without the activator.

The invention contemplates the production of the tin oxide film by either one of two different procedures. Thus, in one method the steps followed in producing the electrically conducting glass unit are exactly the same as the conventional procedure described above except that, following the application of a silver-flux electrode material, the organic halogen-free spray material is substituted for the stannic chloride solution in producing the electrically conducting film.

Such a unit accomplishes the primary purpose of this invention, in that it will not have the high resistance interfacial band between the film and electrode. However, the film may be slightly less conducting than one produced from the conventional tin halide spray, and may exhibit a slightly brownish color.

Generally speaking therefore, we presently prefer to employ a slightly modified procedure which is based on our discovery that if a leading spray of the organic chloride ion-free material is used, followed by one or more sprays of the conventional stannic chloride solution, a film is produced which has all of the good electrical and optical properties of the stannic chloride produced tin oxide film without the objectionable high resistance band at the silver electrode-stannic oxide film interface.

Figure 4:
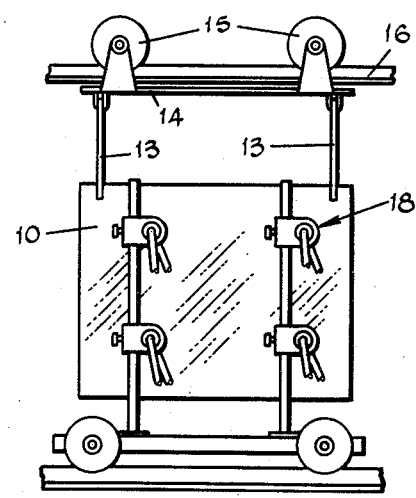
Fig. 4 is a side elevation of the apparatus of Fig. 3.

In practicing this latter phase of the invention, the right or left hand set of guns in Fig. 4 can be used as the lead guns, depending on the direction in which the carriage is moving. It should also be noted that the vapors of both dibutyl tin diacetate and dibutyl tin diformate, two of the preferred halogen-free, organic tin compounds, are extremely disagreeable and possibly toxic which necessitates the installation of adequate ventilating facilities in the filming set-up.

For the purpose of evaluating the electrically conducting glass units produced according to this invention, and particularly those that comprise the combination of silver electrodes with a tin oxide film formed by pre-coating the heated glass with an organic halogen-free tin compound spray followed by filming with stannic chloride, two groups of panels were produced as follows:

Group I

Twenty-five 10" x 10" x ¼" polished plate glass panels were used in the first group. All panels were prepared for coating by applying as electrode material along two opposite edges of the glass a mixture of approximately 65.6% silver, 7.8% flux, 18% organic binder and 8.54% thinner and then heating the glass to a temperature of approximately 1350° F. to fire the electrodes onto the glass and prepare the glass for filming. Eight of these panels were then sprayed with a conventional coating material consisting of 30% stannic chloride in isopropyl alcohol. The remaining 17 were pre-sprayed prior to applying the same 30% stannic chloride spray. The pre-spray material was composed of a mixture of 100 cc. of dibutyl tin diacetate and 1.5 grams of triphenyl antimony. The panels were coated successively with these two solutions as they were withdrawn from the furnace. Three spray guns, each delivering at the rate of 4.2 cc. per second, were used for the stannic chloride solution. The preliminary coating with dibutyl tin diacetate was delivered through the spray gun at a rate of 2.5 cc. per second.

Group II

The second group of twenty-four panels was prepared in a similar manner except that sixteen were given a preliminary coating using a mixture of 50% dibutyl tin diacetate and 50% isopropyl alcohol with 1.5 grams of triphenyl antimony added for each 100 cc. of this mixture.

Resistance measurements were made on all of the panels after they were coated. The electrodes were reinforced with air-dry silver (according to the disclosure in Patent No. 2,628,299) on all but six panels of each group and resistance measurements were repeated. Voltage tests were made on each of the panels at various voltages. After light transmission measurements all, except three, of the panels which passed the voltage tests were laminated to 10" x 10" x ¼" polished plate lites with .060" thick polyvinyl butyral plasticized with 21 parts plasticizer between lites and with parting media over the electrodes.

After lamination, the panels were voltage tested, then cold soaked at −65° F. The panels were again voltage tested and then cold soaked at −65° F. While the panels were still cold, they were again voltage tested. This last test was repeated three times on each of the panels that successfully passed each test. Light transmission measurements were repeated after lamination.

Resistance measurements to determine changes of resistance with changes in temperature were made on the three unlaminated panels at various temperatures. A water soak test was made on one of the unlaminated panels.

The following results were noted and recorded:

Group I

Resistance measurements and voltage tests on panels with electrodes reinforced with air-dry silver prior to lamination:

| No. | Resistance After Coating, ohms | Resistance After Air-Dry, ohms | Resistance Change, ohms | Voltage, 425 v. | Tests, 900 v. |
|---|---|---|---|---|---|
| 1 | 119.5 | 118.2 | −0.7 | OK | OK |
| 2 | 109.3 | 108.6 | −0.7 | OK | OK |
| 3 [1] | 160.4 | 107.8 | −52.6 | OK | OK |
| 4 | 101.1 | 100.7 | −0.4 | OK | OK |
| 5 | 102.8 | 102.5 | −0.3 | NG | |
| 6 [1] | 138.3 | 104.5 | −35.8 | OK | OK |
| 7 | 114.1 | 113.6 | −0.5 | OK | OK |
| 8 | 107.9 | 107.2 | −0.7 | OK | OK |
| 9 [1] | 150.6 | 96.2 | −54.4 | OK | OK |
| 10 | 108.7 | 108.0 | −0.7 | OK | OK |
| 11 | 111.6 | 110.6 | −1.0 | OK | OK |
| 12 [1] | 145.6 | 97.2 | −48.4 | NG | |
| 13 | 100.6 | 100.0 | −0.6 | OK | OK |
| 14 | 110.8 | 110.0 | −0.8 | OK | OK |
| 15 [1] | 140.6 | 107.1 | −33.5 | OK | OK |
| 16 | 118.1 | 117.4 | −0.7 | OK | OK |
| 19 | 105.9 | 105.1 | −0.8 | OK | OK |
| 22 | 107.4 | 106.8 | −0.6 | OK | OK |
| 23 | 107.4 | 106.5 | −0.9 | OK | OK |

[1] Panels coated with regular 30% stannic chloride. Others pre-coated with dibutyl tin diacetate. Panels No. 5 and No. 12 failed on 425 volts from a scratch in the coating.

Resistance measurements and voltage tests on panels without electrodes reinforced with air-dry silver prior to lamination:

| No. | Resistance after Coating, ohms | Voltage Tests | | | | |
|---|---|---|---|---|---|---|
| | | 150 v. | 300 v. | 425 v. | 600 v. | 900 v. |
| 17 | 96.1 | OK | OK | OK | OK | OK |
| 18 [1] | 142.7 | NG | | | | |
| 20 | 109.8 | OK | OK | OK | OK | OK |
| 21 [1] | 160.4 | NG | | | | |
| 24 | 118.9 | OK | OK | OK | OK | OK |
| 25 [1] | 150.2 | NG | | | | |

[1] Panels coated with regular 30% stannic chloride. All other panels in Group I were pre-coated with dibutyl tin diacetate.

Panels No. 18, 21 and 25 all failed at 150 volts or an average power of approximately 140 watts per square foot. Failures occurred at interface of silver electrode and coating.

Average power input for those panels passing 900 volt test was approximately 10,000 to 12,000 watts per square foot.

Group II

Resistance measurements and voltage tests on panels with electrodes reinforced with air-dry silver prior to lamination:

| No. | Resistance After Coating, ohms | Resistance After Air-Dry, ohms | Resistance Change, ohms | Voltage, 425 v. | Tests, 900 v. |
|---|---|---|---|---|---|
| 102 | 112.9 | 111.5 | −1.4 | OK | OK |
| 105 | 112.0 | 111.4 | −0.6 | OK | OK |
| 108 | 121.1 | 120.2 | −0.9 | OK | OK |
| 110 | 116.5 | 115.5 | −1.0 | OK | OK |
| 111 | 117.0 | 116.4 | −0.6 | OK | OK |
| 112 [1] | 152.0 | 114.7 | −37.3 | OK | OK |
| 113 | 128.2 | 122.9 | −5.3 | OK | OK |
| 114 | 113.6 | 112.5 | −1.1 | OK | OK |
| 115 [1] | 151.6 | 119.2 | −32.4 | OK | OK |
| 116 | 119.1 | 117.9 | −1.2 | OK | OK |
| 117 | 119.8 | 119.3 | −0.5 | OK | OK |
| 118 [1] | 149.3 | 116.6 | −32.7 | OK | OK |
| 119 | 116.5 | 115.4 | −1.1 | OK | OK |
| 120 | 120.9 | 119.9 | −1.0 | OK | OK |
| 121 [1] | 139.2 | 119.4 | −19.8 | OK | OK |
| 122 | 128.7 | 128.3 | −0.4 | OK | OK |
| 123 | 130.8 | 130.1 | −0.7 | OK | OK |
| 124 [1] | 140.4 | 125.0 | −15.4 | OK | OK |

[1] Panels coated with regular 30% stannic chloride. All other panels in Group II were pre-coated with 50% dibutyl tin diacetate.

Resistance measurements and voltage tests on panels without electrodes reinforced with air-dry silver prior to lamination:

| No. | Resistance after Coating, ohms | Voltage Tests | | | |
|---|---|---|---|---|---|
| | | 150 v. | 300 v. | 600 v. | 900 v. |
| 101 | 111.1 | OK | OK | OK | OK |
| 103 [1] | 149.0 | NG | | | |
| 104 | 101.5 | OK | OK | NG | |
| 106 [1] | 128.3 | NG | | | |
| 107 | 109.3 | OK | OK | OK | NG |
| 109 [1] | 130.5 | OK | NG | | |

[1] Panels coated with regular 30% stannic chloride. Others pre-coated with 50% dibutyl tin diacetate.

Panels Nos. 103, 106 and 109 failed at the interface between the electrode and the conductive coating.

Panels No. 104 and No. 109 failed from a scratch in the conductive coating.

Average power on panel No. 101 at 900 volts was in excess of 10,000 watts per square foot.

Group I

Post-lamination resistance measurements and voltage tests:

| No. | Resistance Before Lamination, ohms | Resistance After Lamination, ohms | Resistance Change, ohms | Voltage Test, 425 v. |
|---|---|---|---|---|
| 1 | 118.2 | 116.5 | −1.7 | OK |
| 4 | 100.7 | 99.7 | −1.0 | OK |
| 6 [1] | 104.5 | 102.5 | −2.0 | OK |
| 7 | 113.6 | 112.3 | −1.3 | OK |
| 8 | 107.2 | 106.1 | −1.1 | OK |
| 9 [1] | 96.2 | 95.2 | −1.0 | OK |
| 10 | 108.0 | 106.9 | −1.1 | OK |
| 11 | 110.6 | 109.1 | −1.5 | OK |
| 13 | 100.0 | 99.1 | −0.9 | OK |
| 14 | 110.0 | 108.6 | −1.4 | OK |
| 15 [1] | 107.1 | 105.1 | −2.0 | OK |
| 16 | 117.4 | 115.7 | −1.7 | OK |
| 17 [2] | 96.1 | 95.2 | −0.9 | OK |
| 19 | 105.1 | 103.5 | −1.6 | OK |
| 20 [2] | 109.8 | 108.5 | −1.3 | OK |
| 22 | 106.8 | 105.3 | −1.5 | OK |
| 23 | 106.5 | 105.4 | −1.1 | OK |
| 24 | 118.9 | 119.2 | +0.3 | NG |

[1] Panels coated with regular 30% stannic chloride. Others pre-coated with dibutyl tin diacetate.
[2] Panels without electrodes reinforced with air-dry silver.
Panel No. 24 possibly failed from a scratch in the conductive coating.

*Cold soak tests.*—The first cold soak test consisted of soaking each panel for three hours at −65° F., removing the panel from the cold soak chamber and voltage testing at 425 volts after the panel had returned to room temperature. Three more cold soak tests were made for three hours, two hours, and sixteen hours respectively. At the end of each cold soak period, 425 volts were applied to each panel while it was still cold and for a sufficient length of time to remove accumulated frost. All units passed these tests with the exception of panel No. 9. Failure on No. 9 may have been caused by a scratch in the conductive coating.

Group II

Post-lamination resistance measurements and voltage tests:

| No. | Resistance Before Lamination, ohms | Resistance After Lamination, ohms | Resistance Change, ohms | Voltage Test, 425 v. |
| --- | --- | --- | --- | --- |
| 101 [1] | 111.1 | 109.9 | −1.2 | OK |
| 102 | 111.5 | 110.0 | −1.5 | OK |
| 105 | 111.4 | 109.4 | −2.0 | OK |
| 108 | 120.2 | 118.0 | −2.2 | OK |
| 110 | 115.5 | 113.6 | −1.9 | OK |
| 112 [2] | 114.7 | 111.4 | −3.3 | OK |
| 113 | 122.9 | 120.7 | −2.2 | OK |
| 114 | 112.5 | 110.4 | −2.1 | OK |
| 115 [2] | 119.2 | 116.6 | −2.6 | OK |
| 116 | 117.9 | 116.1 | −1.8 | OK |
| 117 | 119.3 | 117.9 | −1.4 | OK |
| 118 [2] | 116.6 | 113.7 | −2.9 | OK |
| 119 | 115.4 | 113.8 | −1.6 | OK |
| 120 | 119.9 | 117.8 | −2.1 | OK |
| 121 [2] | 119.4 | 116.9 | −2.5 | OK |
| 123 | 130.1 | 128.0 | −2.1 | OK |
| 124 [2] | 125.0 | 121.2 | −3.8 | OK |

[1] Panel without electrodes reinforced with air-dry silver.
[2] Panels coated with regular 30% stannic chloride. Others pre-coated with 50% dibutyl tin diacetate.

*Cold soak tests.*—After each of three cold soaks at −65° F. of three hours, three hours, and two hours respectively, a 425 volt test was given to each of the laminated panels of Group II while the units were cold. The power was applied for a period of time sufficient to remove accumulated frost. There were no failures on any of the laminated units of this group during these tests.

Groups I and II

Light transmission measurements made on both laminated and unlaminated units are shown in the following table:

| Group I | Unlaminated, Percent T Ill. A. | Laminated, Percent T Ill. A. | Group II | Unlaminated, Percent T Ill. A | Laminated, Percent T Ill. A |
| --- | --- | --- | --- | --- | --- |
| 1 | 80.3–86.7 | 80.2–83.4 | 101 | 84.5 | 82.3 |
| 2 | 78.5–85.0 | | 102 | 83.4 | 81.8 |
| 3 [1] | 80.6–84.5 | | 103 [1] | 83.5 | |
| 4 | 80.0–87.0 | 80.3–83.1 | 104 | 83.1 | 81.6 |
| 5 | 78.2–84.2 | | 105 | 85.3 | 82.9 |
| 6 [1] | 79.8–83.0 | 81.2–82.3 | 106 [1] | 82.5 | 82.0 |
| 7 | 81.3–85.2 | 80.3–82.5 | 107 | 82.5 | |
| 8 | 83.3–86.8 | 81.3–83.1 | 108 | 84.5 | |
| 9 [1] | 75.5–83.5 | 80.2–82.6 | 109 [1] | 84.4 | 82.5 |
| 10 | 83.0–96.3 | 82.3–83.4 | 110 | 84.4 | 82.6 |
| 11 | 81.5–85.8 | 81.0–83.0 | 111 | 82.3 | 81.8 |
| 12 [1] | 78.4–82.5 | | 112 [1] | 83.4 | 82.1 |
| 13 | 77.9–82.7 | 79.0–82.1 | 113 | 86.4 | 83.3 |
| 14 | 77.8–85.4 | 79.3–82.9 | 114 | 84.5 | 82.8 |
| 15 [1] | 81.7–83.3 | 81.3–82.4 | 115 [1] | 83.5 | 82.2 |
| 16 | 81.3–85.2 | 80.7–83.0 | 116 | 84.8 | 82.4 |
| 17 | 76.8–82.8 | 78.5–81.2 | 117 | 83.9 | 82.0 |
| 18 [1] | 82.3–83.8 | | 118 [1] | 84.7 | 83.0 |
| 19 | 81.0–86.0 | 80.8–83.0 | 119 | 86.3 | 83.5 |
| 20 | 82.3–87.0 | 81.2–83.0 | 120 | 84.3 | 82.4 |
| 22 | 83.6–87.0 | 81.8–83.4 | 122 | 85.0 | |
| 21 [1] | 80.8–84.4 | | 121 [1] | 84.5 | 82.7 |
| 23 | 79.0–85.3 | 80.3–82.9 | 123 | 86.0 | 83.2 |
| 24 | | 80.5–82.8 | 124 [1] | 84.7 | 82.3 |

[1] Panels coated with regular 30% stannic chloride. Panels in Group I were pre-coated with dibutyl tin diacetate. Panels in Group II were pre-coated with 50% dibutyl tin diacetate.

Viewing the two types of film in the edge light, showed a great decrease in fog or haze in the lites pre-coated with dibutyl tin diacetate.

Resistance measurements made on three unlaminated panels at four different temperatures are shown in the table below:

| No. | Group | Resistance at −60° F., ohms | Resistance at 32° F., ohms | Resistance at 85° F., ohms | Resistance at 212° F., ohms |
| --- | --- | --- | --- | --- | --- |
| 122 | II | 129.8 | 130.0 | 130.1 | 131.5 |
| 2 | I | 108.9 | 109.0 | 109.5 | 110.2 |
| 3 [1] | I | 107.5 | 107.7 | 108.5 | 109.2 |

[1] Panel No. 3 was coated with regular 30% stannic chloride. Panel No. 2 was pre-coated with dibutyl tin diacetate. Panel No. 122 was pre-coated with 50% dibutyl tin diacetate.

The resistance measurements shown in the following table are those values of resistance of each of the three unlaminated panels after each had been heated for 10 minutes at each of the indicated temperatures and allowed to cool again to room temperature.

| No. | Group | Resistance at 212° F., ohms | Resistance at 400° F., ohms | Resistance at 600° F., ohms | Resistance at 800° F., ohms |
| --- | --- | --- | --- | --- | --- |
| 122 | II | 109.5 | 109.3 | 109.2 | 114.9 |
| 2 | I | 130.6 | 130.6 | 130.6 | 140.0 |
| 3 [1] | I | 107.9 | 107.0 | 106.0 | 115.6 |

[1] Panel No. 3 was coated with regular 30% stannic chloride. Panel No. 2 was pre-coated with dibutyl tin diacetate. Panel No. 122 was pre-coated with 50% dibutyl tin diacetate.

A water soak test was made on one of the unlaminated panels pre-coated with dibutyl tin diacetate. After a period of soaking in water for 48 hours, the coating showed no evidence of deterioration.

The above tests demonstrate that pre-coating glass panels with an organic, halide free tin compound prior to coating with the conventional stannic chloride spray, on a glass plate provided with silver electrodes, does not inhibit the conductivity of the electrical conductive coating. The weak interface between the silver electrode and the conductive coating does not exist on these panels pre-coated with the organic, chloride ion-free spray. This is evidenced by the low resistance drop after electrode reinforcement and the ability to withstand high voltage at the electrode-conductive coating interface when the electrodes were not reinforced. The conductive coating resulting from the dual coating of first dibutyl tin diacetate and then 30% stannic chloride is as durable electrically and physically as the coating made from just 30% stannic chloride. Light transmission is generally higher and haze is decreased on the pre-coated panels.

Another effect of the pre-spray is that the first, or lead, guns of halogen-free spray brings the temperature of the glass down through the critical temperature range between 1150° and 1350° F.

It is to be understood that the forms of the invention herewith shown and described are to be taken as illustrative embodiments only of the same, and that various changes in the shape, size and arrangement of parts, as well as various procedural and compositional changes may be resorted to without departing from the spirit of the invention or the scope of the subjoined claims.

We claim:

1. In an electrically conducting glass unit the combination with a sheet of glass, of silver electrodes arranged in spaced relation on and tightly adherent to a surface of said sheet, and a transparent electrically conducting film consisting primarily of tin oxide and resulting from the contact of a halogen-free liquid comprising dibutyl tin diacetate with glass heated to substantially its point of softening on said surface between and in electrical contact with said silver electrodes, said combination being characterized by a strong interface between said electrode and said film.

2. In an electrically conducting glass unit the combination with a sheet of glass, of silver electrodes arranged in spaced relation on and tightly adherent to a surface of said sheet, and a transparent electrically conducting film consisting primarily of tin oxide and resulting from the contact of a halogen-free liquid comprising dibutyl tin diformate with glass heated to substantially its point of softening on said surface between and in electrical contact with said silver electrodes, said combination being characterized by a strong interface between said electrode and said film.

3. In an electrically conducting glass unit the combination with a sheet of glass, of silver electrodes arranged in spaced relation on and tightly adherent to a surface of said sheet, and a transparent electrically conducting film consisting primarily of tin oxide and resulting from the contact of a halogen-free solution of dibutyl tin diacetate and triphenyl antimony in an organic solvent with glass heated to substantially its point of softening on said surface between and in electrical contact with said silver electrodes, said combination being characterized by a strong interface between said electrode and said film.

4. The method of producing an electrically conducting glass unit which comprises applying strips of silver-flux in liquid form along spaced lines on the surface of a glass sheet, heating said sheet to approximately 1350° F., spraying the heated sheet with an organic compound of tin selected from the class consisting of dibutyl tin diacetate, dibutyl tin diformate, dibutyl tin dilaurate, dibutyl tin oxide, dibutyl diphenyl tin, dibutyl tin ethylate, tin oleate, tetraphenyl tin, diethyl tin ethylate, tetrabutyl tin and dibutyl tin diethylate in a chloride ion free solution through the critical temperature range of approximately 1350 to 1150° F., and then spraying the sheet with a solution of a tin halide.

5. In an electrically conducting glass unit a combination with a sheet of glass, of silver electrodes arranged in spaced relation and tightly adherent to a surface of said sheet, a transparent electrically conducting film consisting primarily of tin oxide and resulting from the contact of a halogen-free liquid comprising an organic compound of tin selected from the group consisting of dibutyl tin diacetate, dibutyl tin diformate, dibutyl tin dilaurate, dibutyl tin oxide, dibutyl diphenyl tin, dibutyl tin ethylate, tin oleate, tetraphenyl tin, diethyl tin ethylate, tetrabutyl tin and dibutyl tin diethylate with glass heated to substantially its point of softening on said surface between and in electrical contact with said silver electrodes, said combination being characterized by a strong interface between said electrode and said film.

6. In an electrically conducting glass unit the combination with a sheet of glass, of silver electrodes arranged in spaced relation on and tightly adherent to a surface of said sheet, a transparent electrically conducting film consisting primarily of tin oxide and resulting from the contact of a halogen-free liquid comprising an organic compound of tin selected from the group consisting of dibutyl tin diacetate, dibutyl tin diformate, dibutyl tin dilaurate, dibutyl tin oxide, dibutyl diphenyl tin, dibutyl tin ethylate, tin oleate, tetraphenyl tin, diethyl tin ethylate, tetrabutyl tin and dibutyl tin diethylate with glass heated to substantially its point of softening on said surface between and in electrical contact with said silver electrodes, and a second transparent electrically conducting film of tin oxide resulting from the contact of a liquid comprising stannic chloride on said first mentioned film, said combination being characterized by a relatively low resistance interface between said electrode and said first mentioned film.

7. In an electrically conducting glass unit the combination with a sheet of glass, of silver electrodes arranged in spaced relation on and tightly adherent to a surface of said sheet, and a transparent electrically conducting film consisting primarily of tin oxide and resulting from the contact of a halogen-free liquid comprising dibutyl tin diacetate and triphenyl stibine with glass heated to substantially its point of softening on said surface between and in electrical contact with said silver electrodes, said combination being characterized by a strong interface between said electrode and said film.

8. In an electrically conducting glass unit the combination with a sheet of glass, of silver electrodes arranged in spaced relation on and tightly adherent to a surface of said sheet, a reaction product of dibutyl tin diacetate and hot glass in the form of a transparent electrically conducting film on said surface between and in electrical contact with said electrodes, and a second transparent electrically conducting film of tin oxide that is the reaction product of stannic chloride covering said first mentioned film, said combination being characterized by a relatively low resistance interface between said electrode and said film.

References Cited in the file of this patent

UNITED STATES PATENTS 2,628,299     Gaiser  ---------------- Feb. 10, 1953